(12) United States Patent
Morgulis (10) Patent No.: US 6,607,335 B2
(45) Date of Patent: Aug. 19, 2003

(54) CUTTING TOOL ASSEMBLY AND CUTTING INSERT THEREFOR

(75) Inventor: Rafael Morgulis, Karmiel (IL)

(73) Assignee: Iscar, Ltd., Tefen (IL)

( * ) Notice: Subject to any disclaimer, the term of this patent is extended or adjusted under 35 U.S.C. 154(b) by 88 days.

(21) Appl. No.: 09/968,870

(22) Filed: Oct. 3, 2001

(65) Prior Publication Data

US 2002/0028116 A1 Mar. 7, 2002

Related U.S. Application Data

(63) Continuation of application No. PCT/IL00/00197, filed on Mar. 29, 2000.

(30) Foreign Application Priority Data

Apr. 29, 1999 (IL) .................................................. 129665

(51) Int. Cl.[7] .............................. B23C 5/20; B26D 1/00
(52) U.S. Cl. ......................... 407/40; 407/114; 407/116
(58) Field of Search ............................. 407/40, 43, 50, 407/56, 113, 114, 115, 116

(56) References Cited

U.S. PATENT DOCUMENTS

| | | | | | |
|---|---|---|---|---|---|
| 2,805,467 A | * | 9/1957 | Greenleaf | ..................... | 407/38 |
| 2,805,469 A | | 9/1957 | Greenleaf | ..................... | 29/105 |
| 3,716,900 A | * | 2/1973 | Erkfritz | ........................ | 407/40 |
| 5,695,303 A | * | 12/1997 | Boianjiu et al. | ............. | 407/114 |
| 6,053,671 A | * | 4/2000 | Stedt et al. | .................... | 407/35 |
| 6,120,217 A | * | 9/2000 | Stadtfeld et al. | .............. | 407/21 |
| 6,254,316 B1 | * | 7/2001 | Strand | ......................... | 407/113 |

FOREIGN PATENT DOCUMENTS

| | | |
|---|---|---|
| DE | 1245252 | 7/1967 |
| DE | 296 08 668 U1 | 9/1997 |
| FR | 1151923 | 2/1958 |
| FR | 1462877 | 12/1966 |
| GB | 695778 | 8/1953 |
| GB | 1113475 | 5/1968 |
| GB | 2097705 | 11/1982 |

OTHER PUBLICATIONS

International Search Report of PCT/IL00/00197 dated Aug. 17, 2000.
International Preliminary Examination Report of PCT IL00/00197 dated Jun. 11, 2001 with Examined Claims.

* cited by examiner

Primary Examiner—Henry W. H. Tsai
(74) Attorney, Agent, or Firm—Womble Carlyle (57) ABSTRACT

A cutting tool assembly rotatable about an axis of rotation comprising a tool and a plurality of cutting inserts mounted therein. The tool comprises a crown affixed to a tool body. Each one of the cutting inserts has an even number of indexable cutting edges and is clamped in the tool in an insert receiving pocket that is generally radially directed. The tool body has a conical surface against which the cutting inserts abut, the conical surface extends to the periphery of the tool body, is inwardly rearwardly slanted and has equally peripherally distributed substantially radially directed recesses.

43 Claims, 7 Drawing Sheets

CUTTING TOOL ASSEMBLY AND CUTTING INSERT THEREFOR

RELATED APPLICATIONS

This is a Continuation of the U.S. Designation of PCT/IL00/00197, filed Mar. 29, 2000.

FIELD OF THE INVENTION

The present invention relates to a cutting tool assembly having replaceable indexable cutting inserts for use in rotary machining operations in general and in face milling applications in particular.

BACKGROUND OF THE INVENTION

Indexable cutting inserts are normally clamped in milling cutters either directly in individual insert receiving pockets formed in the body of the milling cutter, or in cartridges retained in appropriate recesses formed in the body of the milling cutter. Cartridges can be made with an adjusting mechanism for adjusting the location of the cutting inserts. Such milling cutters requiring individually designed and produced holding members for each individual insert tend to be complex and expensive. Also, the number of inserts clamped in the milling cutter is limited by the size of the holding members.

In U.S. Pat. No. 4,522,538 a milling cutter is described that eliminates the need for producing individual holding members for each cutting insert. However, radially outward movement of the insert is prevented by the lip 26 which engages and supports a second side 51 of the insert thereby retaining the insert with the rim 22. As can clearly be seen in, e.g., FIGS. 2, 3 and 5, the rim 22 extends radially beyond the cutting inserts thereby limiting the cutting depth of the tool and the side approach to a shoulder in a workpiece.

SUMMARY OF THE INVENTION

In accordance with the present invention there is provided a cutting tool assembly rotatable about an axis of rotation A comprising:
  a tool; and
  a plurality of replaceable cutting inserts clamped in insert receiving pockets peripherally distributed in the tool;
  the tool comprising:
    a tool body; and
    a crown affixed to the tool body;
  the tool body has a front face divided into a peripheral portion, having a periphery, and an inner portion, the peripheral portion is frusto-conical in shape and is inwardly rearwardly directed from the periphery to the inner portion slanting at an angle α;
  the crown has a front face, a rear face, a peripheral side face therebetween and a plurality of peripherally distributed generally radially directed insert receiving slots opening into the front, rear and peripheral side faces;
  the insert receiving pockets comprise the insert receiving slots bound axially by the peripheral portion of the tool body front face;
  each insert receiving pocket has tangential, radial and axial abutment surfaces, being generally tangentially, radially and axially directed, respectively, for locating the cutting insert therein, the axial abutment surface being a portion of the peripheral portion of the front face of the tool body;
  each insert receiving pocket is open in a radial direction so that at least a portion of the insert clamped therein extends radially beyond the tool.

Typically, said angle α is between 0° to 5°.

Preferably said peripheral portion is ground.

Further preferably, said peripheral portion has equally peripherally distributed substantially radially directed recesses.

Still further preferably, said recesses open into the periphery of the peripheral portion.

Generally, each cutting insert of said plurality of replaceable cutting inserts has a geometrical shape selected from the group of octagonal, quadrangular, hexagonal and round geometrical shapes.

In accordance with the present invention, each one of said plurality of replaceable cutting inserts is clamped in the tool by means of a generally axially directed clamping screw having a front abutting portion at its front end.

Further in accordance with the present invention, the cutting insert has identical top and bottom surfaces and a side surface between the top and bottom surfaces, the cutting insert is indexable about an axis of indexing symmetry B perpendicular to the top and bottom surfaces and passing through the center thereof and is reflection symmetric about a median plane M parallel to the top and bottom surfaces, the top surface and the bottom surface meet with the side surface at top and bottom edges, respectively, at least a portion of at least one of the edges being a cutting edge having a rake surface, axial abutment surfaces directed at an angle γ with respect to the median plane M extend from the top and bottom edges inwardly towards the axis B and merge at the median plane M, a continuously extending tangential abutment surface merges with the rake surface and is perpendicular to the axis B.

Preferably, said axial abutment surfaces are ground.

Typically, said tangential abutment surface has radially extending protrusions.

In accordance with a preferred embodiment, said cutting insert has clamping surfaces that extend from the tangential abutment surface in an inward direction towards the median plane M and are directed at an angle β with respect to the median plane M.

Generally, said cutting insert has a central through bore.

Typically, said cutting insert further comprises a land in the top and bottom surfaces thereof, the land merging with the cutting edges.

Preferably, the cutting edge has a relief flank in the side surface, extending from the cutting edge to the axial abutment surface.

Typically when assembled, the axial abutment surface of the cutting insert abuts against the peripheral portion of the tool body front face, at least one relief flank of the cutting insert abuts against the radial abutment surface of the crown, a tangential abutment surface of the cutting insert abuts against a tangential abutment surface of the crown and the cutting insert is clamped in the tool by means of a generally axially directed clamping screw having a front abutting portion at its front end.

In accordance with a preferred embodiment, two relief flanks of the cutting insert abut against the radial abutment surface of the crown and an axial abutment surface adjacent to the abutted axial abutment surface is located freely in a recess in the peripheral portion.

In accordance with another embodiment, the cutting insert has a top surface, a bottom surface parallel to the top surface, a side surface between the top and bottom surfaces and an axis of indexing symmetry B perpendicular to the top and bottom surfaces and passing through the center thereof, the top surface and the side surface meet at an edge, at least a part of which is a cutting edge, a rake surface in the top surface extends from the cutting edge, axial abutment surfaces directed at an angle γ with respect to the top surface extend from the edge towards the bottom surface and inwardly towards the axis B, the bottom surface has a continuously extending tangential abutment surface that is perpendicular to the axis B.

Further in accordance with the present invention there is provided a cutting insert that comprises identical top and bottom surfaces and a side surface therebetween. The cutting insert is indexable about an axis of indexing symmetry B and is reflection symmetric about a median plane M parallel to the top and bottom surfaces, the top surface and the bottom surface meet with the side surface at top and bottom edges, respectively, at least a portion of at least one of the edges being a cutting edge having a rake surface, axial abutment surfaces directed at an angle γ with respect to the median plane M extend from the top and bottom edges inwardly towards the axis B and merge at the median plane M, a continuously extending tangential abutment surface merges with the rake surface and is perpendicular to the axis B.

Preferably, said axial abutment surfaces are ground.

Typically, said tangential abutment surface has radially extending protrusions.

In accordance with a preferred embodiment, said cutting insert has clamping surfaces that extend from the tangential abutment surface in an inward direction towards the median plane M and are directed at an angle β with respect to the median plane M.

Generally, said cutting insert has a central through bore.

Typically, said cutting insert further comprises a land in the top surface thereof, the land merging with the cutting edges.

Also in accordance with the present invention there is provided a cutting insert having a regular octagonal shape, the cutting insert has a top surface, a bottom surface and a side surface therebetween, the cutting insert is indexable about an axis of indexing symmetry B and is reflection symmetric about a median plane M, parallel to the top and bottom surfaces, each of the top and bottom surfaces meet with the side surface at eight cutting edges, adjacent cutting edges meet at a cutting corner, a land merges with the cutting edges and the cutting corners in each of the top and bottom surfaces, the land merges with a rake surface having edge portions adjacent cutting edges and corner portions adjacent cutting corners, a continuously tangential abutment surface merges with the rake surface in an inward direction of the cutting insert, said tangential abutment surface is further distanced from the median plane M than the cutting edges, flat, perpendicular to the axis B and preferably ground, the tangential abutment surface has radially extending protrusions merging with each corner portion, clamping surfaces extend from the tangential abutment surface in an inward direction towards the axis B and towards the median plane M and are directed at an angle β with respect to the median plane M, negative relief flanks which are preferably ground merge with the cutting edges and the cutting corners in the side surface, axial abutment surfaces preferably ground and directed at an angle γ with respect to the median plane M extend inwardly from the relief flanks 80 towards the axis B and merge at the median plane M.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE PREFERRED EMBODIMENT

Attention is first drawn to FIGS. 1 to 6 showing a cutting tool assembly 10 rotatable about an axis of rotation A, comprising a tool 12, replaceable cutting inserts 14, and, clamping screws 16 having a front abutting portion 17. The tool 12 consists of a crown 18 mounted axially on a tool body 20 by means of assembling screws 22. The tool body 20 has a front face 26 from which protrudes forwardly a locating pin 24 mating into a corresponding locating bore 28 in the crown 18.

The front face 26 is divided into a peripheral portion 30 having a periphery 27, and inner portion 31. The inner portion 31 is further divided into an intermediate portion 36 and a central portion 37. The peripheral portion 30 is rearwardly directed from the periphery 27 towards the intermediate portion 36 and is frusto-conical in shape, being rearwardly slanted at an angle α, of preferably 1.5° to the horizontal (see FIG. 4). The peripheral portion 30 is ground thereby enabling accurate axial positioning of the cutting inserts 14 as will be described below. The peripheral portion 30 has equally peripherally distributed recesses 32. The recesses 32 are generally directed with respect to a radial direction at a radial rake angle Φ which is chosen in accordance with the required working conditions. The angle Φ is typically in a range of 3 to 12 degrees for negative radial rake angles and 0 to 10 degrees for positive radial rake angles. In the central portion 37 of the front face 26, a hollow cylindrical protrusion 34 extends forwardly and has a lateral surface 35. The intermediate portion 36 is flat, axially directed and constitutes a front abutment surface. The front abutment surface 36 has equally peripherally distributed axially extending threaded bores 38.

The crown 18 has a disc-like shape having a front face 40, a rear face 42 and a peripheral side face 41 therebetween. The rear face 42 has a flat axially directed rear abutment surface 43. A central bore 44 having a wall 45 extends between the front face 40 and the rear face 42. On a circle having a diameter greater than the central bore diameter there are equally peripherally distributed axially directed through bores 46 each of which has an axial abutment surface 48, mating with a threaded bore 38 in the tool body 20 and receiving therein an assembling screw 22. On the periphery of the crown 18 there are equally peripherally distributed generally radially directed insert receiving slots 50. Each slot comprises three surfaces, two substantially parallel generally tangentially directed surfaces connected by a third generally radially directed surface. The radially directed surface constitutes a radial abutment surface 52, for radially locating a cutting insert, and one of the two tangentially directed surfaces constitutes a tangential abutment surface 54, for tangentially locating a cutting insert.

When assembling the crown 18 onto the tool body 20, the cylindrical protrusion 34 fits into the central bore 44 so that the wall 45 is in contact with the lateral surface 35. The crown 18 is axially slided till its rear abutment surface 43 bears against the front abutment surface 36 of the tool body 20. The required angular relational position between the crown 18 and the tool body 20 is assured by the insertion of the locating pin 24 into the locating bore 28, with both the locating pin and the locating bore produced to tightly mate. At this stage, the assembling screws 22 are inserted through the through bores 46 and threadingly engaged into the threaded bores 38. In the assembled configuration, there is generally no contact between the crown 18 and the peripheral portion 30. Furthermore, in the assembled configuration each insert receiving slot 50 forms, together with a portion of the peripheral portion 30 in the vicinity thereof, an insert receiving pocket 51. The crown 18 and the tool body 20 are made as two separate parts mainly for the ease of manufacturing and particularly for the grinding of the peripheral portion 30.

Attention is now drawn to FIGS. 7 to 11. As shown, the cutting insert 14 is of a regular octagonal shape, has an axis of indexing symmetry B and a plane of symmetry M. The cutting insert 14 has a top surface 56 identical to a bottom surface 58 and therefore only one of them will be described. The top surface 56 is generally parallel to the bottom surface 58 and they are both perpendicular to the axis B. A side surface 60 connects between the top and bottom surfaces. The intersection between the top surface 56 and the side surface 60 defines eight cutting edges 62. Adjacent cutting edges 62 meet at a cutting corner 64. Along the periphery of the top surface 56, merging with the cutting edges 62 and cutting corners 64, is a continuous peripherally extending land 65. The land 65 merges with a rake surface 66 having edge portions 68 adjacent cutting edges 62 and corner portions 70 adjacent cutting corners 64. Merging with the rake surface 66 and continuously peripherally extending in an inward direction of the cutting insert 14 is a tangential abutment surface 72 that is flat and perpendicular to the axis B.

Figure 9:
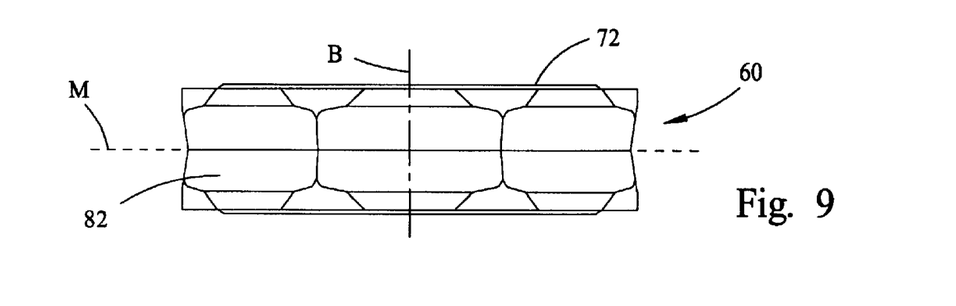
FIG. 9 is a side view of the cutting insert of FIG. 7.
Figure 10:
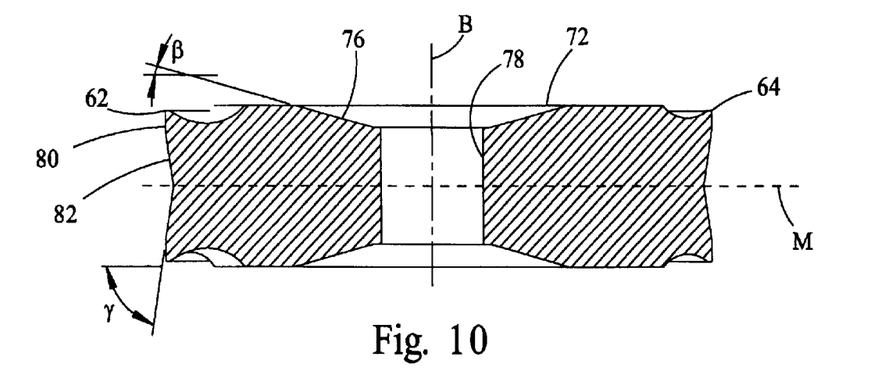
FIG. 10 is a cross-sectional view along line X—X in FIG. 8.

As best seen in FIGS. 9 and 10, the tangential abutment surface 72 is further distanced from the median plane M than the cutting edges. In order to increase the accuracy of location of the cutting inserts when mounted in the tool, the tangential abutment surface 72 is preferably ground. Radially extending protrusions 74 of the tangential abutment surface 72 merge with each corner portion 70. Clamping surfaces 76 extend from the tangential abutment surface 72 in an inward direction towards the axis B and towards the median plane M and are directed at an angle $\beta$ with respect to the median plane M. A centrally located bore 78 extends between the top surface 56 and the bottom surface 58. The bore 78 is utilized during some production processes and is not an essential feature of the present invention. Hence, the cutting insert 14 can be produced without it.

Figure 11:
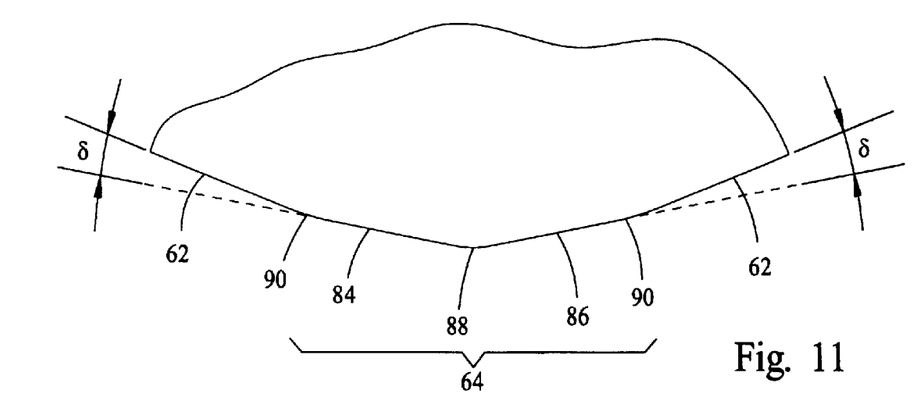
FIG. 11 is an enlarged view of detail XI in FIG. 8.

In the side surface 60, merging with the cutting edges 62 and cutting corners 64, are negative relief flanks 80. Axial abutment surfaces 82, directed at an angle $\gamma$ with respect to the median plane M, extend inwardly from the relief flanks 80 towards the axis B and merge at the median plane M. The axial abutment surfaces 82 are preferably ground. As shown in FIG. 11, two adjacent cutting edges 62 meet at a cutting corner 64. The cutting corner 64 comprises two wiper edges 84 and 86, for right and left hand milling, which are connected through a merging region 88. Each of the wiper edges is connected through an intermediate region 90 to the adjacent cutting edge 62 and is inclined thereto at an angle $\delta$. The angle $\delta$ is preferably chosen to equal to the angle $\alpha$.

Figure 1:
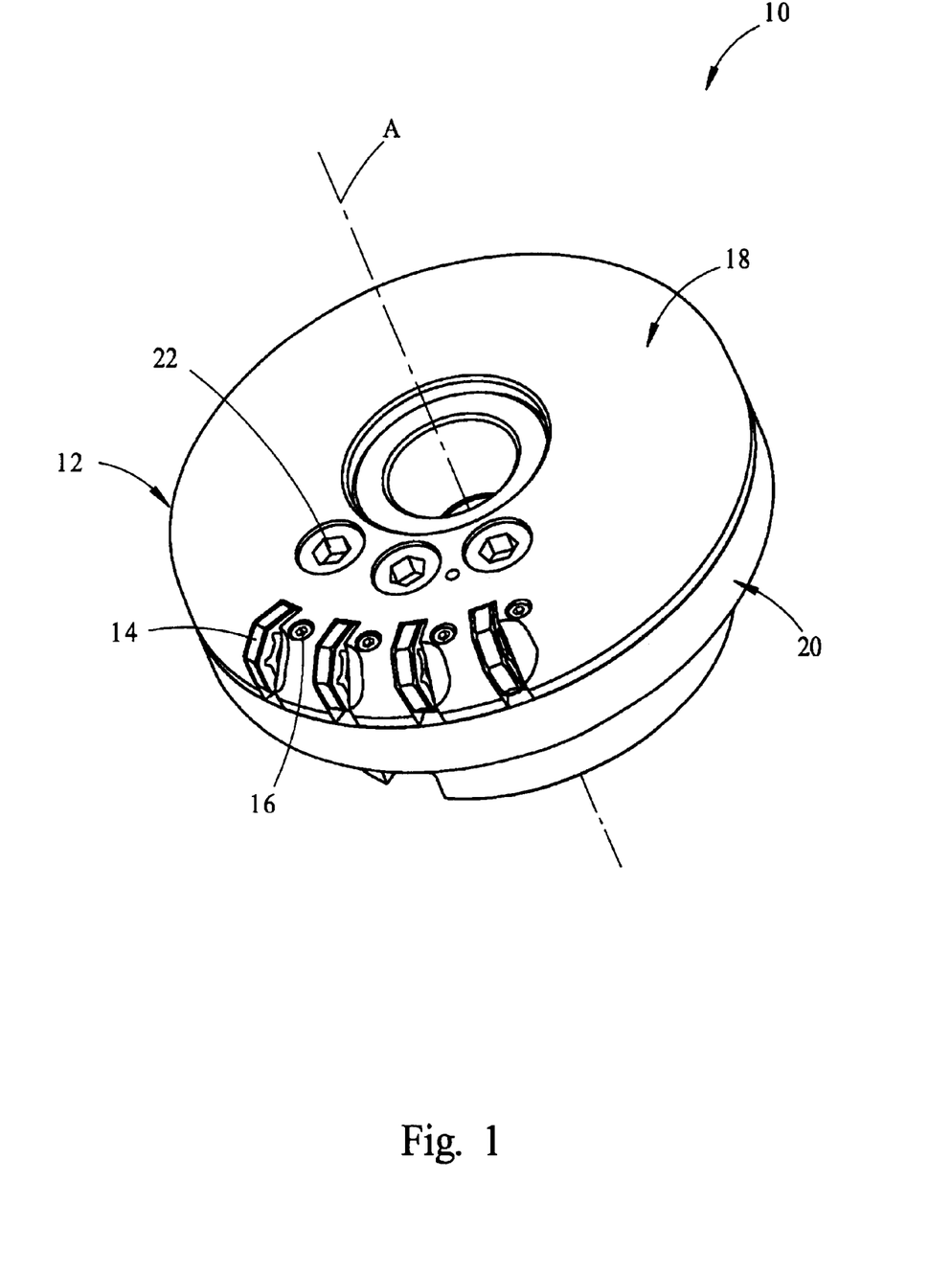
FIG. 1 is a perspective view of a cutting tool assembly according to the present invention, showing in detail only a sector of the cutting tool assembly.
Figure 2:
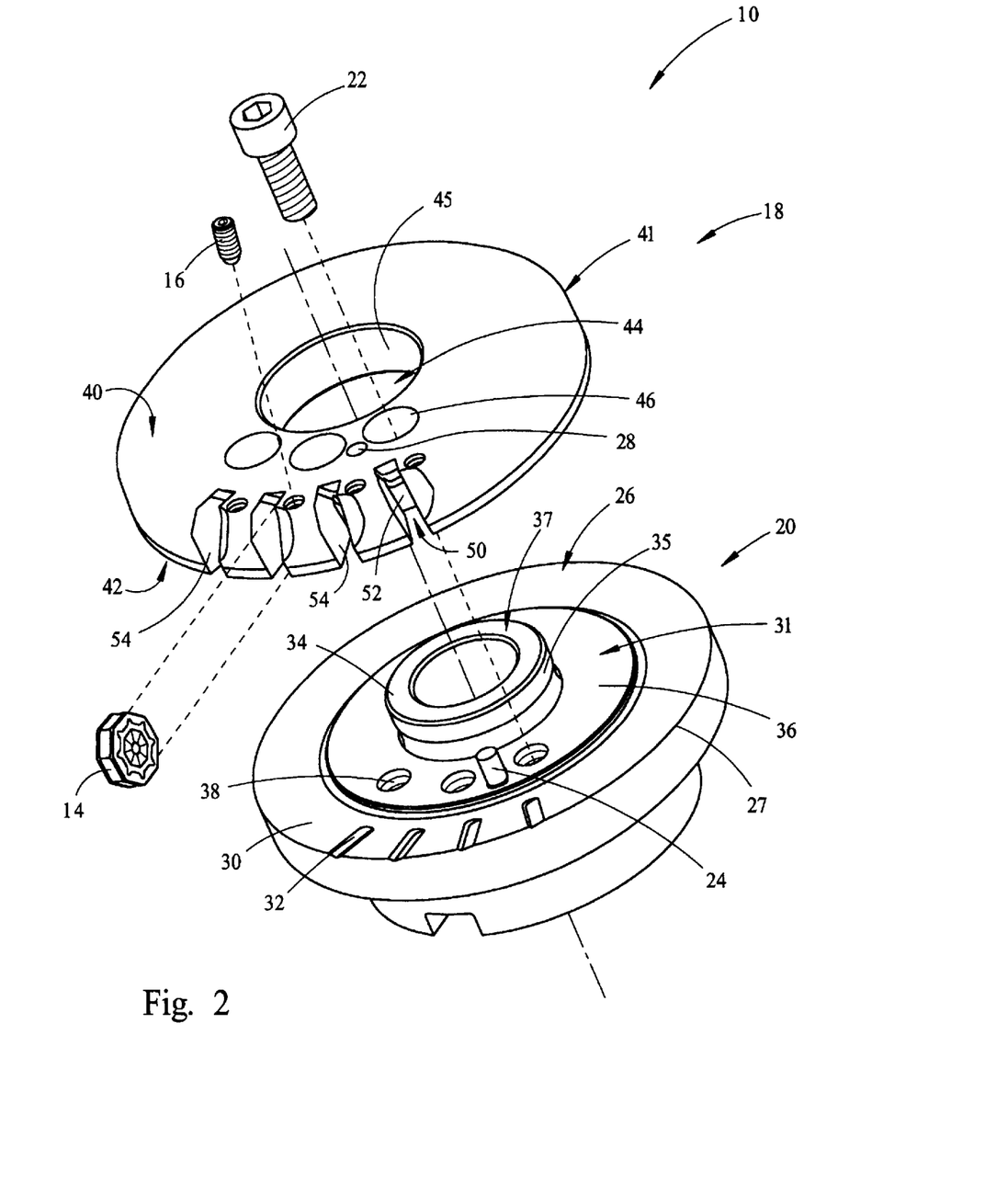
FIG. 2 is an exploded view of the cutting tool assembly shown in FIG. 1.
Figure 3:
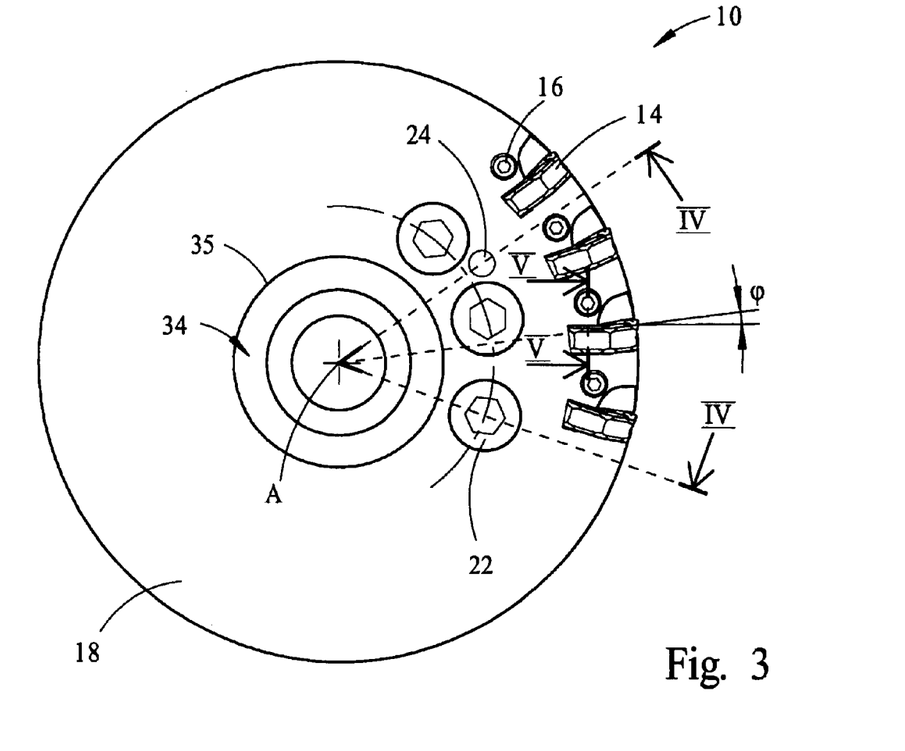
FIG. 3 is a top view of the cutting tool assembly shown in FIG. 1.
Figure 4:
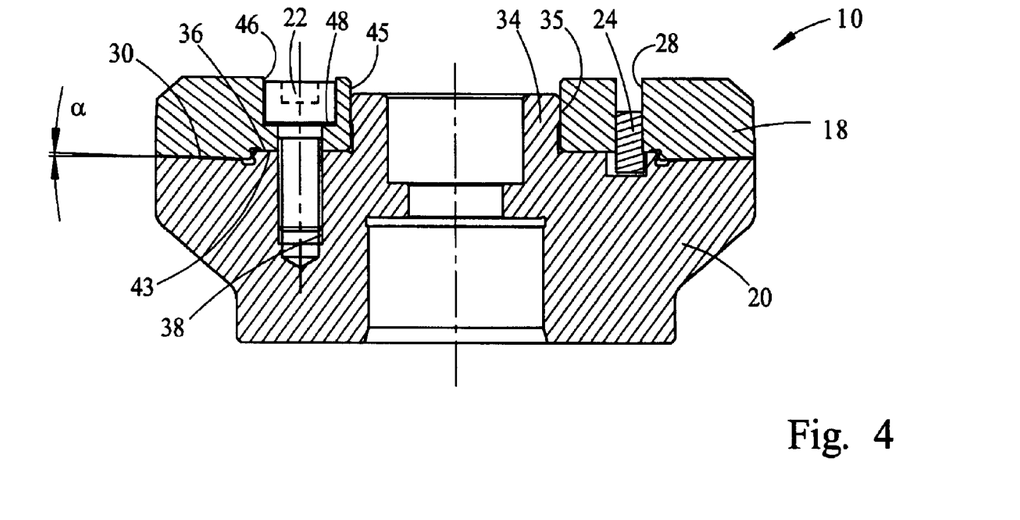
FIG. 4 is a cross-sectional view along line IV—IV in FIG. 3.
Figure 5:
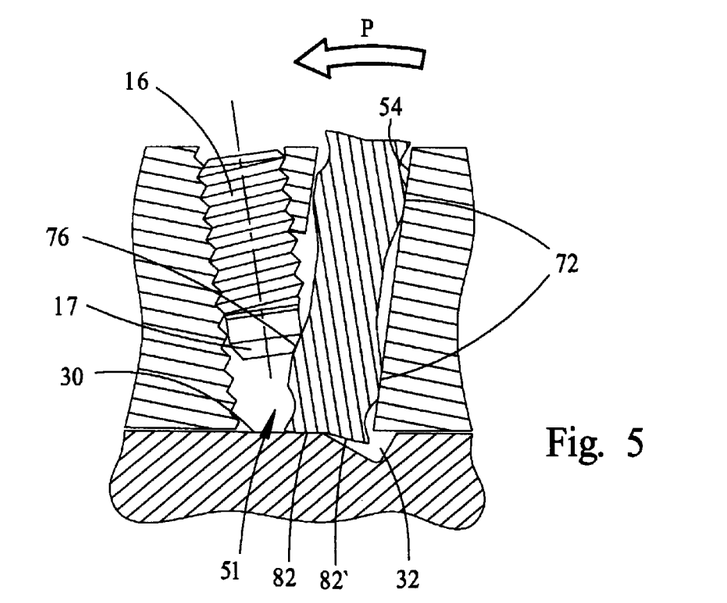
FIG. 5 is a cross-sectional view along line V—V in FIG. 3.

The assembly of a cutting insert 14 in the cutting tool assembly 10 will now be described. The cutting insert 14 is inserted into the insert receiving pocket 51 so that two relief flanks 80 abut against the radial abutment surface 52, an axial abutment surface 82 abuts against the peripheral portion 30 and a tangential abutment surface 72 abuts against a tangential abutment surface 54. As shown in FIG. 5, an axial abutment surface 82, denoted 82, adjacent to the abutted axial abutment surface 82 is located freely in a recess 32.

Figure 6:
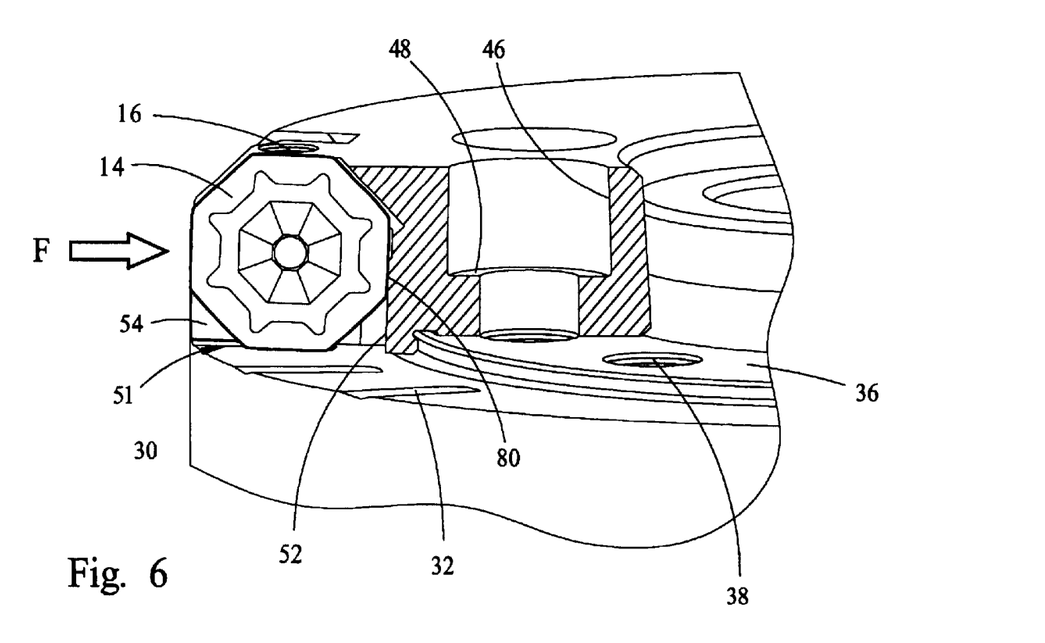
FIG. 6 is a perspective partially sectioned view of the cutting tool assembly of FIG. 1 showing a cutting insert seated in an insert receiving pocket.
Figure 7:
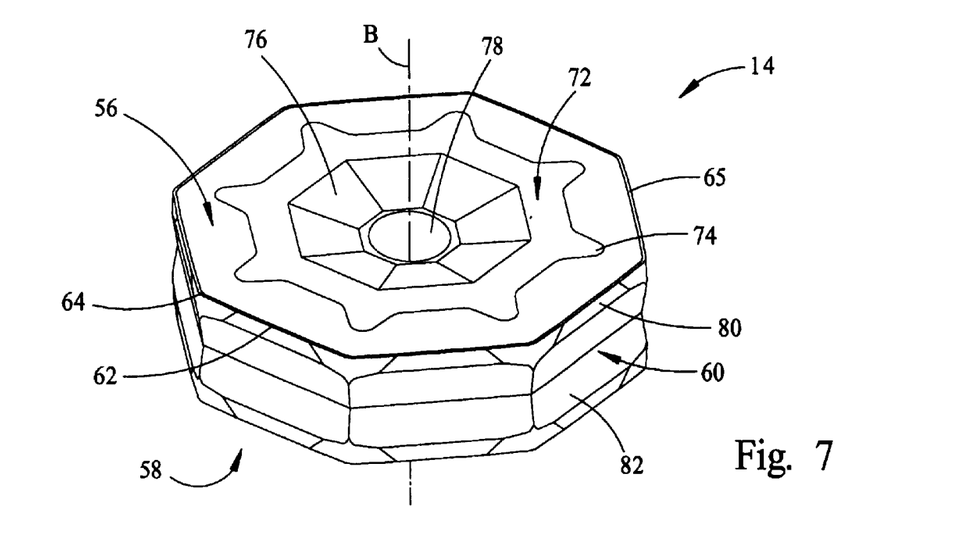
FIG. 7 is a perspective view of a cutting insert according to the present invention.
Figure 8:
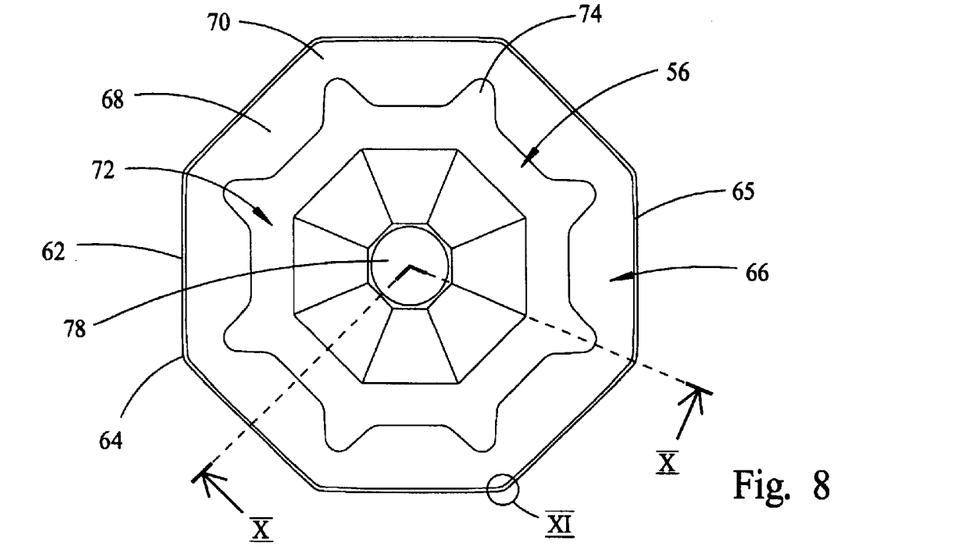
FIG. 8 is a top view of the cutting insert of FIG. 7.

At this stage, the clamping screw 16 is tightened so that the screw front abutting portion 17 presses against a clamping surface 76. This tightening of the screw serves two purposes. First, it will bring abutment surfaces of the cutting insert 14 and tool 12 into abutment and retain them in abutment. Second, for those abutment surfaces already in abutment it will assure that abutment is maintained. The action of tightening of the clamping screw 16 will now be described in greater detail. There are three possible actions. One, the cutting insert 14 is axially displaced till the axial abutment surface 82 abuts against the peripheral portion 30. Two, the cutting insert 14 is tangentially displaced till the tangential abutment surface 54 abuts against the tangential abutment surface 72. The protrusions 74 serve to give support to the insert against possible anti-clockwise rotation of the insert as denoted by the arrow P in FIG. 5. Three, the rotation of the clamping screw 16 in an inward direction towards the tool body 20 causes a frictional force between the front abutting portion 17 of the clamping screw 16 and the clamping surface 76 that it is bearing against. Such a force, as denoted by the arrow F in FIG. 6, is in a direction that assures the abutting of the cutting insert 14 against the radial abutment surface 52 of the crown 18.

By way of the above described construction, especially by the axial abutment of the ground abutment surfaces 82 of the cutting insert 14 by the ground peripheral portion 30, the exact axial position of the cutting insert 14 is assured. Also, by the fact that the insert receiving pocket 51 is open in a radial direction, at least a portion of the insert 14 clamped therein extends radially beyond the tool 12.

Figure 12:
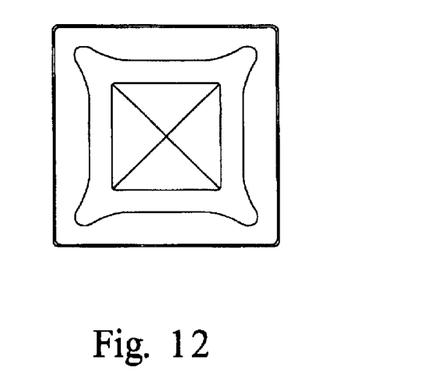
FIG. 12 is a top view of a square cutting insert according to the present invention.
Figure 13:
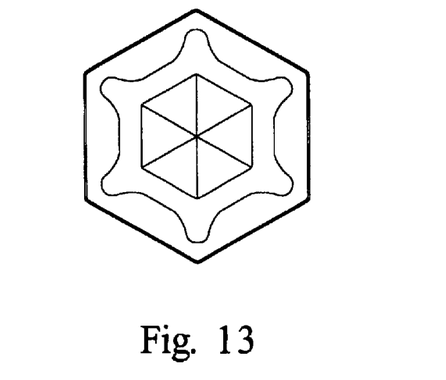
FIG. 13 is a top view of an hexagonal cutting insert according to the present invention.
Figure 14:
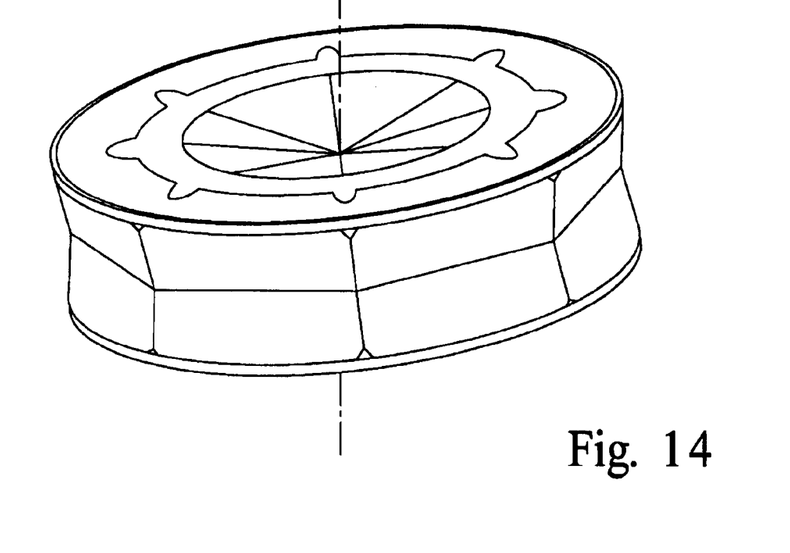
FIG. 14 is a perspective view of a round cutting insert according to the present invention.
Figure 15:
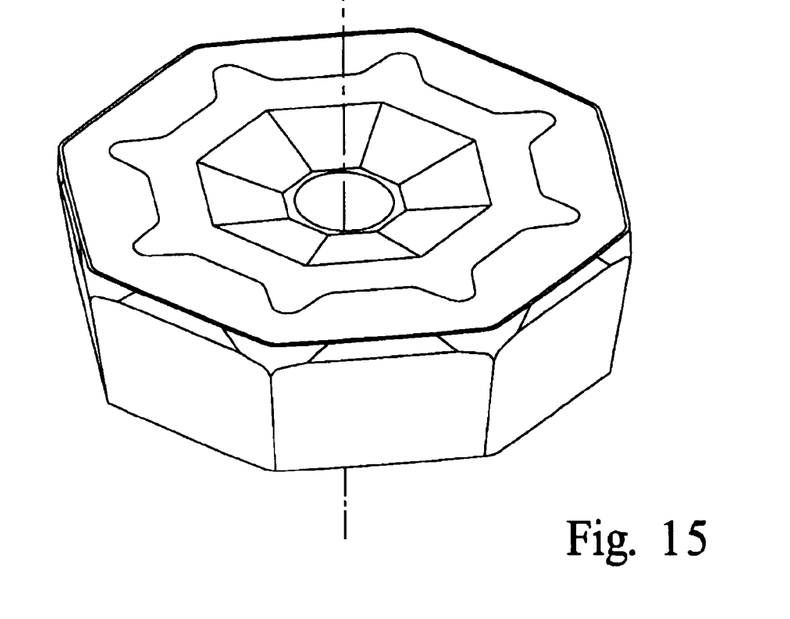
FIG. 15 is a perspective view of an octagonal one sided cutting insert according to the present invention.

Although the present invention has been described to a certain degree of particularity, it should be understood that various alterations and modifications can be made without departing from the spirit or scope of the invention as hereinafter claimed. For example, the cutting insert can have a square shape, as shown in FIG. 12, an hexagonal shape as shown in FIG. 13 and a round shape as shown in FIG. 14. Furthermore, the cutting insert can also be single sided as shown in FIG. 15.

What is claimed is:

1. A cutting tool assembly rotatable about an axis of rotation (A) and comprising:

a tool comprising a tool body and a crown; and a plurality of replaceable cutting inserts clamped in insert receiving pockets peripherally distributed in the tool; wherein the tool body has a front face divided into a peripheral portion having a periphery, and an inner portion, the peripheral portion has equally peripherally distributed substantially radially directed recesses, is frusto-conical in shape and is inwardly rearwardly directed from the periphery to the inner portion slanting at an angle ($\alpha$);

the crown has a front face, a rear face, a peripheral side face therebetween and a plurality of peripherally distributed generally radially directed insert receiving slots opening into the front, rear and peripheral side faces, the crown being distinct from the tool body and the tool being adjustable between a disassembled position in which the crown and tool body are separated from each other and an assembled position in which the crown is affixed to the tool body with the insert receiving slots of the crown merging with the recesses of the tool body;

the insert receiving pockets comprise the insert receiving slots bound axially by the peripheral portion of the tool body front face, when the tool is in the assembled position;

each insert receiving pocket has tangential, radial and axial abutment surfaces, being generally tangentially, radially and axially directed, respectively, for locating the cutting insert therein, the axial abutment surface being a portion of the peripheral portion of the front face of the tool body;

each insert receiving pocket is open in a radial direction so that at least a portion of the insert clamped therein extends radially beyond the tool.

2. A cutting tool assembly according to claim 1, wherein said angle ($\alpha$) is between 0° to 5°.

3. A cutting tool assembly according to claim 1, wherein said peripheral portion is ground.

4. A cutting tool assembly according to claim 1, wherein said recesses open into the periphery of the peripheral portion.

5. A cutting tool assembly according to claim 1, wherein each cutting insert of said plurality of replaceable cutting inserts has a geometrical shape selected from the group of octagonal, quadrangular, hexagonal and round geometrical shapes.

6. A cutting tool assembly according to claim 1, wherein each one of said plurality of replaceable cutting inserts is clamped in the tool by means of a generally axially directed clamping screw having a front abutting portion at its front end.

7. A cutting tool assembly according to claim 1, wherein said cutting insert has identical top and bottom surfaces and a side surface between the top and bottom surfaces, the cutting insert is indexable about an axis of indexing symmetry (B) perpendicular to the top and bottom surfaces and passing through the center thereof and is reflection symmetric about a median plane (M) parallel to the top and bottom surfaces, the top surface and the bottom surface meet with the side surface at top and bottom edges, respectively, at least a portion of at least one of the edges being a cutting edge having a rake surface, axial abutment surfaces directed at an acute angle ($\gamma$) with respect to the median plane (M) extend from the top and bottom edges inwardly towards the axis (B) and merge at the median plane (M), a continuously extending tangential abutment surface merges with the rake surface and is perpendicular to the axis (B).

8. A cutting tool assembly according to claim 7, wherein said axial abutment surfaces are ground.

9. A cutting tool assembly according to claim 7, wherein said tangential abutment surface has radially extending protrusions.

10. A cutting tool assembly according to claim 7, wherein said cutting insert has clamping surfaces that extend from the tangential abutment surface in an inward direction towards the median plane (M) and are directed at an angle ($\beta$) with respect to the median plane (M).

11. A cutting tool assembly according to claim 1, wherein said cutting insert has a central through bore.

12. A cutting tool assembly according to claim 7, wherein said cutting insert further comprises a land in the top and bottom surfaces thereof, the land merging with the cutting edges.

13. A cutting tool assembly according to claim 7, wherein the cutting edge has a relief flank in the side surface, extending from the cutting edge to the axial abutment surface.

14. A cutting tool assembly according to claim 13, wherein when assembled, the axial abutment surface of the cutting insert abuts against the peripheral portion of the tool body front face, at least one relief flank of the cutting insert abuts against the radial abutment surface of the crown, a tangential abutment surface of the cutting insert abuts against a tangential abutment surface of the crown and the cutting insert is clamped in the tool by means of a generally axially directed clamping screw having a front abutting portion at its front end.

15. A cutting tool assembly according to claim 14, wherein two relief flanks of the cutting insert abut against the radial abutment surface of the crown and an axial abutment surface adjacent to the abutted axial abutment surface is located freely in a recess in the peripheral portion.

16. A cutting tool assembly according to claim 1, wherein the cutting insert has a top surface, a bottom surface parallel to the top surface, a side surface between the top and bottom surfaces and an axis of indexing symmetry (B) perpendicular to the top and bottom surfaces and passing through the center thereof, the top surface and the side surface meet at an edge, at least a part, of which is a cutting edge, a rake surface in the top surface extends from the cutting edge, axial abutment surfaces directed at an acute angle ($\gamma$) with respect to the top surface extend from the edge towards the bottom surface and inwardly towards the axis (B), the bottom surface has a continuously extending tangential abutment surface that is perpendicular to the axis (B).

17. A cutting insert having a regular octagonal shape, the cutting insert having a top surface, a bottom surface and a side surface therebetween, the cutting insert being indexable about an axis of indexing symmetry (B) and reflection symmetric about a median plane (M), parallel to the top and bottom surfaces, wherein:

each of the top and bottom surfaces meet with the side surface at eight cutting edges, adjacent cutting edges meet at a cutting corner, a land merges with the cutting edges and the cutting corners in each of the top and bottom surfaces, the land merges with a rake surface having edge portions adjacent cutting edges and corner portions adjacent cutting corners, a continuously extending tangential abutment surface merges with the rake surface in an inward direction of the cutting insert, said tangential abutment surface is further distanced from the median plane (M) than the cutting edges, flat, perpendicular to the axis (B) and ground, the tangential abutment surface has radially extending protrusions merging with each corner portion, clamping surfaces extend from the tangential abutment surface in an inward direction towards the axis (B) and towards the median plane (M) and are directed at an angle (β) with respect to the median plane (M), negative relief flanks which are ground merge with the cutting edges and the cutting corners in the side surface, and axial abutment surfaces which are ground and directed at an acute angle (γ) with respect to the median plane (M) extend inwardly from the relief flanks towards the axis (B) and merge at the median plane (M).

18. A cutting tool assembly having an axis of rotation (A) and comprising:

a tool having a plurality of peripherally distributed insert receiving pockets, the tool comprising:

a tool body having a front face divided into a peripheral portion having a periphery, and an inner portion, the peripheral portion having equally peripherally distributed substantially radially directed recesses; and a crown having a front face, a rear face, a peripheral side face between the front and rear faces, and a plurality of peripherally distributed generally radially directed insert receiving slots opening into the front, rear and peripheral side faces, the crown being distinct from the tool body and the tool being adjustable between a disassembled position in which the crown and tool body are separated from each other and an assembled position in which the crown is affixed to the tool body with the insert receiving slots of the crown merging with the recesses of the tool body;

wherein:

the insert receiving pockets comprise the insert receiving slots bound axially by the peripheral portion of the tool body front face, when the tool is in the assembled position;

each insert receiving pocket has tangential, radial and axial abutment surfaces, being generally tangentially, radially and axially directed, respectively, the axial abutment surfaces being a portion of the peripheral portion of the front face of the tool body; and each insert receiving pocket is open in a radial direction so that at least a portion of the insert clamped therein extends radially beyond the tool.

19. The cutting tool assembly according to claim 18, wherein the peripheral portion is frusto-conical in shape and is inwardly rearwardly directed from the periphery to the inner portion slanting at an angle (α).

20. The cutting tool assembly according to claim 18, further comprising replaceable cutting inserts clamped in said insert receiving pockets.

21. The cutting tool assembly according to claim 20, wherein each cutting insert comprises:

identical top and bottom surfaces with a side surface therebetween, each cutting insert being indexable about an axis of indexing symmetry (B) and reflection symmetric about a median plane (M) parallel to the top and bottom surfaces;

top and bottom edges formed at respective intersections of the top surface and the bottom surface with the side surface, at least a portion of at least one of the edges being a cutting edge having a rake surface;

axial abutment surfaces directed at an acute angle (γ) with respect to the median plane (M) and extend from the top and bottom edges inwardly towards the axis (B) and merge at the median plane (M); and a continuously extending tangential abutment surface merging with the rake surface, the tangential abutment surface being perpendicular to the axis (B).

22. The cutting tool assembly according to claim 21, wherein an axial abutment surface of each cutting insert clamped in one of the insert receiving pockets, extends into one of the recesses formed in the tool body.

23. A cutting tool assembly having a forward end, a rear end, and an axis of rotation A passing through the forward and rear ends, and comprising a tool having a plurality of insert pockets with an indexable cutting insert retained in each insert pocket;

the tool comprising a disc-shaped crown secured to a tool body;

the crown having a front face, a rear face having a rear abutment surface, an outwardly facing peripheral side face extending therebetween, and a plurality of identical receiving slots equally spaced about the axis A;

each receiving slot is inwardly recessed from the peripheral side face and extends between the front and rear faces, and has an outwardly facing radial abutment surface and a tangentially facing tangential abutment surface extending from the radial abutment surface to the peripheral surface;

the tool body having a generally forwardly facing front face having a front abutment surface and a peripheral portion having a periphery, the peripheral portion being inclined with respect to the axis A at an angle a rearwardly directed from the periphery;

the peripheral portion having a plurality of recesses equally spaced about the axis A, each recess being a recessed portion of the peripheral portion and extending radially inward from the periphery;

the crown is affixed to the tool body with its rear abutment surface bearing against the front abutment surface of the tool body and each insert receiving slot forms, together with a portion of the peripheral portion in the vicinity thereof, an insert receiving pocket, the portion of the peripheral portion including at least a portion of a given recess;

each cutting insert having a top surface, an identical opposing bottom surface generally parallel to the top surface, a side surface extending between the top and bottom surfaces, an axis of symmetry B passing through the top and bottom surfaces, a median plane M generally parallel to the top and bottom surfaces about which the cutting insert has reflection symmetry, and a planar tangential abutment surface that is parallel to the median plane M on the top and bottom surfaces;

each of the top and bottom surfaces meet with the side surface at edges, at least a portion of the edges forming a cutting edge;

adjacent each cutting edge on the side surface is a relief flank and adjacent each relief flank is a axial abutment surface;

each axial abutment surface extends inwardly from an associated relief flank towards the axis B at an acute angle γ with respect to the median plane M, each axial abutment surface has an associated reflection symmetric axial abutment surface;

wherein for each cutting insert retained in each insert pocket, the tangential abutment surface of the cutting insert abuts the tangential abutment surface of the slot, a first section of the side surface of the cutting insert abuts a corresponding radial abutment surface, and a given axial abutment surface, of a second section of the side surface, abuts the peripheral portion adjacent the recess with the associated reflection symmetric axial abutment surface of the given axial abutment surface freely located in the recess.

24. A cutting tool assembly according to claim 23, wherein the angle α is between 0° to 5°.

25. A cutting tool assembly according to claim 23, wherein the peripheral portion is ground.

26. A cutting tool assembly according to claim 23, wherein each cutting insert of the plurality of replaceable cutting inserts has a geometrical shape selected from the group of octagonal, quadrangular, hexagonal, and round geometrical shapes.

27. A cutting tool assembly according to claim 23, wherein the axial abutment surfaces are ground.

28. A cutting tool assembly according to claim 23, wherein the tangential abutment surface has radially extending protrusions.

29. A cutting tool assembly according to claim 23, wherein the cutting insert further comprises a land in the top and bottom surfaces thereof, the land merging with the cutting edges.

30. A cutting tool assembly according to claim 23, wherein the cutting insert has clamping surfaces that extend from the tangential abutment surface in an inward direction towards the median plane M and are directed at an angle β with respect to the median plane M.

31. A cutting tool assembly according to claim 23, wherein the relief flank is a negative relief flank.

32. A tool for milling having a forward end, a rear end, and an axis of rotation A passing through the forward and rear ends, and a plurality of insert pockets;

the tool comprising a disc-shaped crown secured to a tool body;

the crown having a front face, a rear face having a rear abutment surface, an outwardly facing peripheral side face extending therebetween, and a plurality of identical receiving slots equally spaced about the axis A;

each receiving slot is inwardly recessed from the peripheral side face and extends between the front and rear faces, and has an outwardly facing radial abutment surface and a tangentially facing tangential abutment surface extending from the radial abutment surface to the peripheral surface;

the tool body having a generally forwardly facing front face having a front abutment surface and a peripheral portion having a periphery, the peripheral portion being inclined with respect to the axis A at an angle c[] rearwardly directed from the periphery;

the peripheral portion having a plurality of recesses equally spaced about the axis A, each recess being a recessed portion of the peripheral portion and extending radially inward from the periphery;

the crown is affixed to the tool body with its rear abutment surface bearing against the front abutment surface of the tool body and each insert receiving slot forms, together with a portion of the peripheral portion in the vicinity thereof, an insert receiving pocket, the portion of the peripheral portion including at least a portion of a given recess.

33. A tool for milling according to claim 32, wherein the angle α is between 0° to 5°.

34. A tool for milling according to claim 32, wherein the peripheral portion is ground.

35. A cutting tool assembly having an axis of rotation (A) and comprising:

a tool comprising a tool body and a separate crown, the tool being adjustable between a disassembled position in which the crown and tool body are separated from each other and an assembled position in which the crown is affixed to the tool body;

the tool body having a front face divided into a peripheral portion having a periphery, and an inner portion, the peripheral portion having equally peripherally distributed substantially radially directed recesses; and the crown having a front face, a rear face, a peripheral side face between the front and rear faces, and a plurality of peripherally distributed generally radially directed insert receiving slots opening into the front, rear and peripheral side faces, wherein:

the insert receiving slots of the crown merge with the recesses of the tool body to thereby form insert receiving pockets, when the tool is in the assembled position, each insert receiving pocket having tangential, radial and axial abutment surfaces with the axial abutment surfaces being a portion of the peripheral portion of the front face of the tool body, and each insert receiving pocket is open in a radial direction so that at least a portion of the insert clamped therein extends radially beyond the tool.

36. The cutting tool assembly according to claim 35, further comprising at least one locating pin formed on one of the tool body and the crown and at least one locating bore formed on the other of the tool body and crown, to thereby facilitate assembly of the tool upon mating the at least one location pin to the at least one locating bore.

37. The cutting tool assembly according to claim 35, further comprising at least one cutting insert seated in one of said insert receiving slots.

38. The cutting tool assembly according to claim 37, wherein the at least one cutting insert has identical top and bottom surfaces, each of said top and bottom surfaces being provided with eight cutting edges.

39. A double-sided cutting insert having a regular polygonal shape, the cutting insert having a top surface, a bottom surface and a side surface therebetween, the cutting insert being indexable about an axis of indexing symmetry (B) and reflection symmetric about a median plane (M), parallel to the top and bottom surfaces, wherein:

each of the top and bottom surfaces meet with the side surface at cutting edges, adjacent cutting edges meet at a cutting corner, a rake surface has edge portions adjacent cutting edges and corner portions adjacent cutting corners, a continuously extending tangential abutment surface merges with the rake surface in an inward direction of the cutting insert, said tangential abutment surface is further distanced from the median plane (M) than the cutting edges, flat, perpendicular to the axis (B) and ground, the tangential abutment surface has radially extending protrusions merging with each corner portion, relief flanks which merge with the cutting edges and the cutting corners in the side surface, and axial abutment surfaces which are ground and directed at an acute angle ($\gamma$) with respect to the median plane (M) extend inwardly from the relief flanks towards the axis (B) and merge at the median plane (M).

40. The cutting insert according to claim 39, wherein the polygonal shape is octagonal, the cutting insert having eight cutting edges on each of the top and bottom surfaces.

41. The cutting insert according to claim 39, wherein the relief flanks are negative relief flanks.

42. The cutting insert according to claim 39, wherein the relief flanks are ground.

43. The cutting insert according to claim 39, wherein each of the top and bottom surfaces further comprises a land merging with the cutting edges, the cutting corners, and the rake surface.

* * * * *